March 5, 1929.  E. J. LE CLAIRE  1,704,133
POPCORN MACHINE
Filed March 3, 1926   3 Sheets-Sheet 1

Inventor
Eugene J. LeClaire
By H. Macfield
Attorney

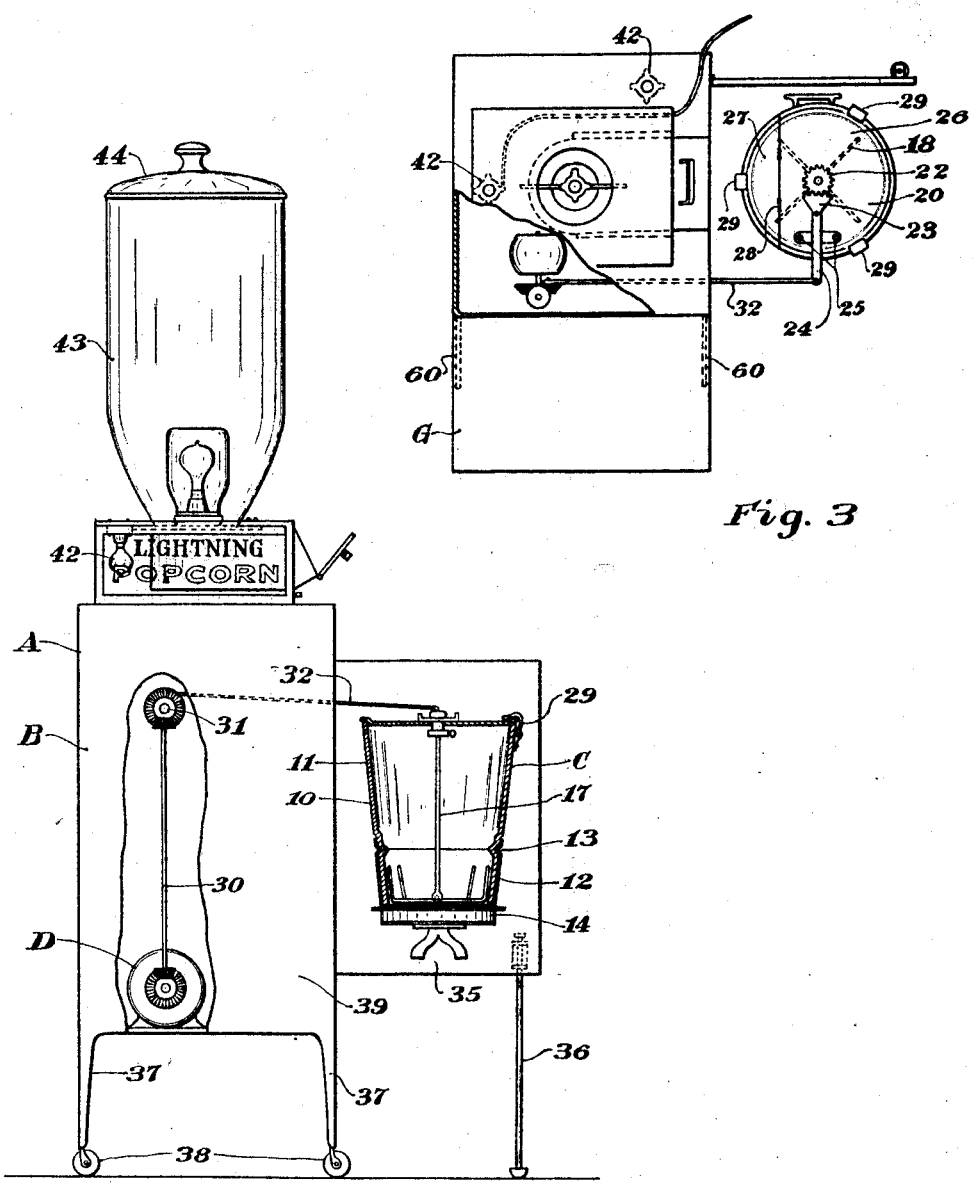

March 5, 1929.  E. J. LE CLAIRE  1,704,133
POPCORN MACHINE
Filed March 3, 1926  3 Sheets-Sheet 3

Inventor
Eugene J. LeClaire
By Homan Fick
Attorney

Patented Mar. 5, 1929.

1,704,133

UNITED STATES PATENT OFFICE.

EUGENE J. LE CLAIRE, OF ST. PAUL, MINNESOTA, ASSIGNOR OF ONE-HALF TO CHARLES J. MULLAN, OF ST. PAUL, MINNESOTA.

POP-CORN MACHINE.

Application filed March 3, 1926. Serial No. 91,936.

My invention relates to popcorn machines wherein it is designed to provide means for popping corn and displaying the same associated with the popping mechanism in a convenient and a compact manner.

Heretofore popcorn machines have been used quite extensively, yet all of the structures are more or less of a complicated nature and of an expensive design, and it is my desire to obviate these features in a popcorn machine and to provide a machine which will pop the corn as it is desired and provide a display cabinet which has a construction designed to provide a very attractive means of displaying the pop-corn for sale and to make the corn crisp and tasty.

A feature of the invention resides in a cabinet adapted to inclose the popping elements and units when they are not desired for use, thereby concealing the popping units in a compact cabinet and yet holding the same freely accessible when they are desired for use.

It is also a feature of the invention to provide a popping kettle which is designed with an oscillating member adapted to be operated either by hand or by a motor so as to continue to oscillate the corn stirring member to thoroughly pop the corn.

The invention includes a transparent globe storage compartment for the popped corn in which the corn is held and wherein an illuminating means is placed so as to keep the corn warm, make it more crisp and dry, and cause the illuminating means to shine through the popcorn in a manner so as to make a very attractive display for my popcorn machine. This feature of the invention will be readily appreciated in considering that an electric illuminating globe of any suitable color may be used within the storage compartment, thus causing colored light to be reflected onto and through the popped corn, making a very attractive display.

It is also a feature of my invention to provide a popping kettle having a very thin and replaceable bottom portion, while the side portions are heavier and adapted to be wear resisting.

My popcorn machine includes a hopper having a screen over which the corn must pass as it is dispensed out of the storage compartment, and by means of the electric lights which are placed about this hopper, the same is kept warm and an illumination is provided in the lower portion of the hopper. This lights up the cabinet-like lower portion of the hopper forming display sides which can contain advertising matter associated with the popcorn and through which the illuminating means will shine. The lower part of the hopper is replaceable and is formed with a screen so that the unpopped kernels of the corn will freely pass through the same together with any foreign matter, thereby giving a popcorn of a clean and very desirable nature. Beneath the hopper I provide a drawer adapted to be readily removable and into which any unpopped kernels and foreign matter can be deposited and easily removed from the hopper of my machine.

It is also a feature of my invention to provide an opening in the hopper in which the butter container may be placed and below which is positioned one of the electric lamps which illuminates the cabinet portion of the hopper.

These features, together with other objects and particular details of construction of my invention will be more fully and clearly set forth in the following specification and claims.

In the drawings forming part of my specification:

Figure 2 is a side view of the same partly illustrated in cross section.

Figure 3 is a plan view of the same, a portion of which is broken away.

Figure 1:
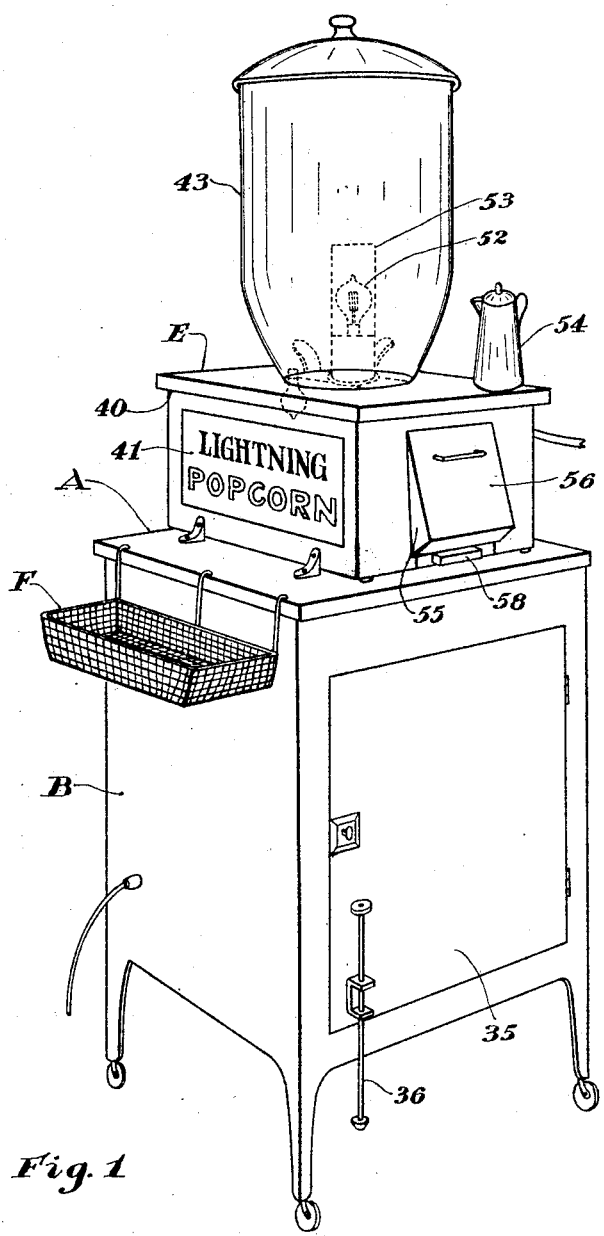
Figure 1 is a perspective view of my popcorn machine.

In the drawings my popcorn machine A is provided with a cabinet B which is adapted to inclose the popping kettle C, together with the motor operating means D. Positioned on the cabinet B and forming a part thereof, I provide a storage compartment E for the popcorn which is a transparent globe-like portion projecting above the base of the storage compartment E.

The popping unit C of my popcorn machine A is provided with a kettle 10 having a body portion 11 of a strong substantial nature, and a removable bottom 12 extending up over the sides and clamped in at 13 to provide a replaceable and very thin-walled bottom portion into which the corn is placed when it is popped.

In close proximity to the bottom 12 I provide an electric heating element 14, or any other suitable heating element, which is adapted to operate rapidly to heat the popping kettle 10 and pop the corn therein.

Within the bottom portion 12 I provide a central pin 15 which is adapted to engage the lower end 16 of the oscillating member 17 which projects down into the kettle 10 and projecting from the end 16 I provide stirring arms 18. These arms project out radially from the end 16 and have an upwardly projecting portion 19 adapted to be positioned in close proximity to the side wall of the bottom of the kettle 10.

The upper end of the member 17 is pivotally supported in the cover 20 at 21 and is provided with a gear 22 which meshes with the driving gear segment 23 which is adapted to be operated by the handle 24. Suitable stops 25 positioned on either side of the handle 24 limit the oscillating operation of the gear segment 23. This keeps the gear 23 in constant mesh with the gear 22.

By oscillating the handle 24 the arms 18 are adapted to oscillate back and forth in the kettle 10 and thus stir the kernels of corn rapidly in a manner so that they will pop very efficiently.

The cover 20 is formed in two parts 26 and 27 which are hinged together at 28 and the cover is adapted to be held by suitable clamps 29 which hold the same firmly to the body 11 of the popping unit C. The clamps 29 permit the cover to be entirely removed so that the kettle 10 may be cleaned out each time after a batch of corn is popped, which keeps the same sweet and clean and efficient in operation. It is desirable that the kettle be cleaned while it is warm, after the batch of popping is complete, as it will then wipe out very readily and in this manner providing an efficient popping unit C.

By means of the motor driving means D which is positioned within the cabinet B of my popcorn machine A, I drive a series of shafts 30 and 31 in a manner to reciprocate the arm 32 which may be connected to the free end of the handle 24 in a manner to oscillate the same. This provides motor means of a suitable nature for oscillating the arms 18 and thereby obviating the necessity of operating the lever 24 by hand.

The popping unit C is mounted upon the door 35 of the cabinet B and the door is provided with an adjustable support 36 which is connected at one side of the same and is adjustable so that it can be projected downward to engage against the ground to hold the door rigid in open position and against straining or placing an undesirable weight on the body B when the door is open. The cabinet B is carried by the legs 37 on the castors 38 which permit the same to be moved about freely. By means of the stop and support 36 the cabinet is inclined to be held rigid in place against free movement when the door 35 is open. By means of this construction my popping unit C may be held freely accessible when desired for use by opening the door 35 or when it is not desired it may be folded into the compartment 39 of the cabinet B, fully and completely concealing the same and leaving the cabinet B of a neat, tidy and attractive nature adapted to support and form a display stand and cabinet for the popped corn.

Upon the cabinet B I provide the display cabinet E which is formed with a lower portion 40 having transparent or window-like sides through which the electric lights 42 placed within the cabinet are adapted to shine so that by placing advertising matter on the windows 41 an attractive display is provided for the base 40 of the popcorn machine A.

Supported to the base 40 I provide the storage or hopper globe 43 which is transparent and is provided with a removable cover 44. The globe 43 is held removable by means of the rods 45 which are formed with a link 46 connecting over the top rim 47 of the globe 43, and are provided with coil springs 48 on the lower end which hold the clips 49 into engagement with the edge 50 of the base of the cabinet 40. This holds the globe 43 rigidly in place upon the cabinet as I provide two or more of these holding rods 45 equally spaced about and projecting inside the hopper globe 43.

Projecting upwardly within the globe 43 I provide an illuminating and heating lamp 52 which is covered by the removable shield 53 of a transparent nature so as to prevent the popcorn from coming in direct contact with the lamp 52. This lamp 52 illuminates the display hopper 43 and the popcorn stored within the same, and when a colored lamp is used a very attractive display means for popcorn is provided as it dispenses and projects the colored light to and through kernels of popped corn which are somewhat translucent and will readily absorb the color from the lamp so as to provide a very, in fact, an extremely attractive popcorn display. At the same time the light 52 heats the hopper 43 sufficiently to keep the corn dry and crisp. I have found that the popcorn is much better the second day after it is popped and after it has been on display in my hopper than it is directly after popping. It seems that the heat from the display lamp 52, together with the illuminating lamps 42 in the cabinet and hopper E keep the corn crisp and dry and make it very tasty.

One of the illuminating lamps 42 are placed to one side in the base cabinet portion 40 and directly above this lamp I form a recess which is screened and upon which the butter kettle 54 placed. This keeps the butter kettle 54 sufficiently warm to keep the butter in a liquid state so that it may be used as the corn is dispensed.

Figure 4:
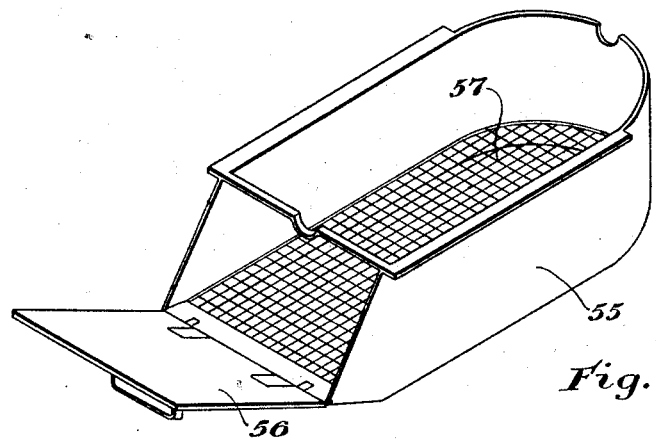
Figure 4 is a perspective view of the removable hopper bottom.
Figure 5:
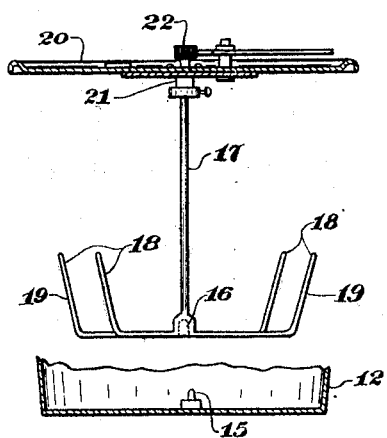
Figure 5 is a detail of the oscillating popper members removed from the popping kettle and illustrating a portion of the bottom of the popping kettle in section.
Figure 6:
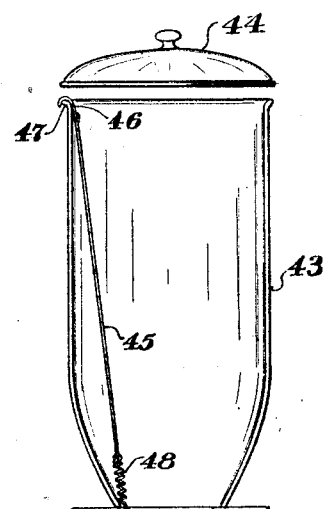
Figure 6 is a sectional view of the top globe of the storage hopper for the popcorn.
Figure 7:
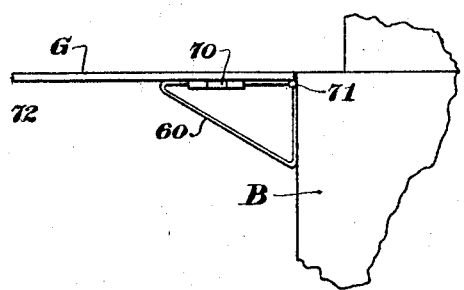
Figure 7 is a detail of a portion of my popcorn machine showing the shelf attached to the side of the cabinet.

The cabinet 40 is formed with a removable hopper member 55 having a door 56 which inclines in a manner so as to close the hopper portion 55. The hopper 55 is removable and is of a construction as illustrated in Figure 4. Within the hopper 55 I provide a screen bottom 56 so that the kernels of corn as they are taken out of the storage hopper E and settled down from the globe storage hopper 43 are adapted to pass over the screen 56. Directly below the removable hopper bottom 55 I provide a drawer 58 which is removable and into which the unpopped kernels of corn, together with any other undesirable material which may be with the popcorn, is adapted to settle. By simply removing the drawer 58 the undesirable kernels and discarded particles which would pass through the screen 57 may be readily removed, keeping the popcorn very presentable and tasty when removed out of the door 56 of the hopper bottom 55.

My popcorn machine A is designed to provide a compact attractive means of popping corn by means of the popping unit C which may be entirely inclosed within the cabinet B. After the corn is all popped and sufficient of it stored in the display hopper 43, it can be dispensed out of the door 56 of the hopper bottom 55 and the corn is sufficiently warmed and dried out by the illuminating means in the base of the cabinet 40, together with the illuminating lamp 52, so that the corn is very crisp and tasty when it is taken out of the door 56. The compact, neat and simple design provided in my popcorn machine are of a very desirable nature.

A basket F may be placed on the side of the cabinet A and a shelf G hinged to the side of the same in a manner so that it may be raised in the position illustrated in Figure 3 when it is desired, or dropped down in a position to hang along the side of the cabinet B. The shelf G is formed with depending bracket arms 60 which are hinged at 70 to the bottom of the shelf G, while the shelf proper is hinged at 71 to the cabinet B. One of these brackets 61 is positioned on either side of the under part of the shelf so that when the free end 72 of the shelf is engaged and lifted from the side of the cabinet A, the brackets 60 drop into operating position to engage against the side of the cabinet and hold the shelf in operative position. By merely folding the free ends of the brackets 60 inward the shelf may be dropped out of operative position.

In accordance with the patent statutes I have described the principles of operation of my popcorn machine, and while I have shown a particular construction in the drawings, I desire to have it understood that these illustrations are only suggestive of a means of carrying out my invention and that the invention may be carried out and applied to uses other than those above set forth within the scope of the following claims.

I claim:

1. A popcorn machine including, a cabinet having a door, a popping unit supported by said door in a manner so as to be concealed within the cabinet when the door is closed.

2. A popcorn machine including, a popping unit, a cabinet for inclosing said unit, a door for supporting said unit, a display compartment positioned on said cabinet, and a transparent globe-like hopper portion including illuminating means positioned within said hopper in a manner to transfuse colored light through the popcorn on display.

3. A popcorn machine including, a cabinet, a door for said cabinet, a popping unit mounted on said door, an arm for supporting said door in open position to balance said popcorn machine, and motor means for operating said popping unit to oscillate the kernels of popcorn within the same.

4. A popcorn machine including, a cabinet, a popping unit supported within said cabinet in a manner to be drawn out when the door of said cabinet is opened, a cover for said popping unit, a kernel oscillating means formed by a depending rod pivotally supported in said cover, radially extending arms formed on the lower end of said rod, and an oscillating lever arm geared to said rod on top of said cover in a manner to permit corn to be popped by an oscillating movement of said radial arms.

5. A popcorn machine including, a portable cabinet, a door on said cabinet, a popping kettle, removably supported by said door, a heating element supported beneath said kettle, an oscillating kernel stirring means carried by the cover of said kettle, and lever means for operating said stirring means within said kettle.

6. A popcorn machine including, a portable cabinet, a door for said cabinet, a popping kettle supported removable on said door, a heating element associated with said kettle, a removable cover for said kettle, an oscillating member supported by said cover, an arm adapted to operate said oscillating member carried on said cover, and motor means adapted to be connected to the free end of said arm to cause said oscillating means to operate automatically by the operation of said motor means.

7. A popcorn machine including, a portable cabinet, a popping unit removably positioned within said cabinet in a manner to swing out into operating position when the door of said cabinet is opened, a display hopper formed projecting from the upper part of said cabinet having a transparent globe portion, means for removably supporting said globe, means for supporting electric lights within the base of said hopper and said globe, and means for heating the butter kettle by the electric lights within the base of said hopper.

8. A popcorn machine comprising, a portable cabinet, a popping unit within said cabinet adapted to be held in a compact state when not desired for use, said unit being movable with the door in a manner to be exposed in operative position, a heating element for said unit, and a hand operating lever adapted to operate said unit to pop corn.

9. A portable popcorn machine including, a cabinet base portion, a popping unit supported within said base portion, a door adapted to move the popping unit into operative position, a display cabinet portion projecting upwardly from said base portion having a transparent removable globe, and means for illuminating said display cabinet portion and globe to direct colored light on the popcorn on display and illuminate the base of said display portion for the popcorn.

EUGENE J. LE CLAIRE.